(12) United States Patent
Gläser et al.

(10) Patent No.: US 9,920,853 B2
(45) Date of Patent: Mar. 20, 2018

(54) ELECTROMAGNETICALLY OPERABLE HIGH-PRESSURE GAS VALVE

(71) Applicant: Mesa Parts GmbH, Lenzkirch (DE)

(72) Inventors: Stefan Gläser, Bottighofen (CH); Patrick Braun, Titisee-Neustadt (DE)

(73) Assignee: Mesa Parts GmbH, Lenzkirch (DE)

( * ) Notice: Subject to any disclaimer, the term of this patent is extended or adjusted under 35 U.S.C. 154(b) by 187 days.

(21) Appl. No.: 14/713,232

(22) Filed: May 15, 2015

(65) Prior Publication Data

US 2015/0330529 A1 Nov. 19, 2015

(30) Foreign Application Priority Data

May 16, 2014 (DE) .................. 10 2014 106 940

(51) Int. Cl.
*F16K 31/06* (2006.01)
*F16K 3/02* (2006.01)
(Continued)

(52) U.S. Cl.
CPC ..... *F16K 31/0644* (2013.01); *F02M 21/0233* (2013.01); *F02M 21/0239* (2013.01);
(Continued)

(58) Field of Classification Search
CPC .. F16K 31/0644; F16K 3/029; F16K 31/0655; F16K 31/408; F16K 39/024;
(Continued)

(56) References Cited

U.S. PATENT DOCUMENTS 2,360,612 A * 10/1944 Ludeman ............ F16K 39/024
 137/629
2,496,553 A * 2/1950 Littlefield ............ F16K 31/408
 137/595
(Continued)

FOREIGN PATENT DOCUMENTS

DE 11 68 725 B 4/1964
DE 10 2008 064 409 A1 6/2010
(Continued)

OTHER PUBLICATIONS

Search report for related European patent applicaiton No. 15 166 672.4, dated Oct. 23, 2015.
(Continued)

*Primary Examiner* — Jessica Cahill
*Assistant Examiner* — Daphne M Barry
(74) *Attorney, Agent, or Firm* — Juneau & Mitchell

(57) ABSTRACT

The invention relates to an electromagnetically operable high-pressure gas valve, which is embodied as a pilot valve with a pilot seat and a pilot opening and a main seat with a main opening, with the pilot opening connecting a high-pressure side with a low-pressure side of the valve and it being possible to close it via a main sealing element, the main opening connecting the high-pressure side to the low-pressure side of the valve and it being possible to close it by a main sealing element, and the valve comprising a pilot anchor which acts upon the pilot sealing element, and comprising a main anchor, which acts upon the main sealing element, with the valve comprising a coil that is suitably embodied and arranged to act upon the pilot anchor and the main anchor such that a pilot stroke and a main stroke are independent from each other.

14 Claims, 4 Drawing Sheets

(51) Int. Cl.
*F16K 31/40* (2006.01)
*F16K 39/02* (2006.01)
*F02M 21/02* (2006.01)

(52) U.S. Cl.
CPC ......... *F02M 21/0242* (2013.01); *F16K 3/029* (2013.01); *F16K 31/0655* (2013.01); *F16K 31/408* (2013.01); *F16K 39/024* (2013.01); *Y02T 10/32* (2013.01)

(58) Field of Classification Search
CPC ........... F02M 21/0233; F02M 21/0239; F02M 21/2042; Y02T 10/32
See application file for complete search history.

(56) References Cited

U.S. PATENT DOCUMENTS

| | | | | |
|---|---|---|---|---|
| 2,657,673 | A * | 11/1953 | Littlefield | F16K 31/408 137/596.14 |
| 3,114,532 | A * | 12/1963 | Gray | F16K 31/408 251/30.01 |
| 3,405,906 | A | 10/1968 | Keller | |
| 3,818,927 | A * | 6/1974 | Zeuner | F16K 31/0655 137/110 |
| 4,304,264 | A * | 12/1981 | McClintock | F16K 31/408 137/630.13 |
| 4,679,765 | A * | 7/1987 | Kramer | F16K 31/408 251/282 |
| 4,699,351 | A * | 10/1987 | Wells | F16K 31/408 251/29 |
| 6,443,420 | B1 * | 9/2002 | Hettinger | F16K 31/0693 251/129.07 |
| 6,986,498 | B2 * | 1/2006 | Hirota | F16K 31/406 251/30.03 |
| 9,062,778 | B2 * | 6/2015 | Fukano | F16K 41/12 |
| 2013/0175462 | A1 * | 7/2013 | Suzuki | F16K 31/0655 251/30.01 |

FOREIGN PATENT DOCUMENTS

| | | | | |
|---|---|---|---|---|
| EP | | 0403144 A2 * | 12/1990 | B60T 8/363 |
| EP | | 2 653 763 A2 | 10/2013 | |
| WO | WO 96/15926 A1 | | 5/1996 | |

OTHER PUBLICATIONS

GPTO office action issued in corresponding German Application No. 10 2014 106 940.4, dated Mar. 2, 2015.

* cited by examiner

Stand der Technik

ELECTROMAGNETICALLY OPERABLE HIGH-PRESSURE GAS VALVE

CROSS REFERENCE TO RELATED APPLICATIONS

This patent application claims priority to German Patent Application 10 2014 106 940.4, filed on May 16, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is an electromagnetically operable high-pressure gas valve.

Background of the Invention

From prior art, various electromagnetically operable high-pressure gas valves are known, which are embodied as pilot valves. In such high-pressure gas valves, between the high-pressure side and the low-pressure side a pilot opening with a pilot seat and a main opening with a main seat are arranged, whereby the pilot seat can be closed with the pilot sealing element and the main seat can be closed with a main sealing element. In the high-pressure gas valves known from prior art, as shown in FIG. 3, the pilot sealing element and the main sealing element are both moved via a common anchor.

FIG. 3 shows a cross-sectional illustration of a high-pressure gas valve 100 known from prior art, with an anchor 101 being arranged in a pressure pipe 118. The pressure pipe 118 is provided with a circumferential recess in a section of a rear edge of the anchor 101, which is embodied such that except for a connection brace here a double-cone is formed to guide the flow between the rear part and the frontal part of the pressure pipe. At the exterior of the pressure pipe a coil 112 is arranged that can be electrified, which is suitably embodied for operating the anchor 101 when electrified. The coil 112 is provided at the rear with an annular embodied brace 122 for guiding the flow, which guides a magnetic field of the coil 112 in the direction of the pressure pipe 118.

At the front, the pressure pipe 118 shows a circumferential step, which is embodied both for guiding the magnetic field as well as for supporting the coil 112 and for fastening the high-pressure gas valve 100, for example at a container.

In the present case, the anchor 101 is essentially embodied like a hollow cylinder, with a pilot sealing element 106 being arranged at the front inside the anchor 101. The pilot sealing element 106 is embodied suitable for closing a pilot bore 105 with a pilot seat 103, which bore being embodied in a transitional part 113, with at the front thereof a main sealing element 110 being embodied for closing a main opening 109 with a main seat 107. The transitional part 113, as discernible from FIG. 3, is provided with two press pins 111, arranged opposite each other, can engage the bore 114 of the anchor 101. The main sealing element 110 is arranged at the transitional part 113 and/or in a groove and embodied suitable to seal the main seat 107.

In a closed position of the high-pressure gas valve 100, shown in FIG. 3, the main sealing element 110 closes the main opening 109 and seals at the main seat 107 embodied circumferential at the main opening 109. Further, in the closed position the pilot opening 105 is closed by the pilot sealing element 106, with the pilot sealing element 106 sealing at the pilot seat 103. Between the press pins 111, impressed in the transitional part 113, and the bore 114 in the anchor 101 a first distance a1 is given in the axial direction, which is at least equivalent to a height of a pilot stroke for opening the pilot seat 103.

In order to open the pilot seat, the coil 112 is electrified such that the anchor 101 is pulled off the pressure pipe 118 opposite the pressure acting in the closing direction as well as a spring force of the spring 124 acting in the closing direction and thus the pilot sealing element 106 arranged in the anchor 101 is lifted off the pilot seat 103. After the pilot seat 103 has been opened, a pressure equalization occurs by the pilot opening 105 between the high-pressure side H and the low-pressure side N so that the pressure at the input side $p_{in}$ is subsequently equivalent to the pressure at the output side $p_{out}$. By this pressure equalization the pressures change, acting upon the transitional part 113 and the main sealing element 110, and are essentially compensated. By another electrification of the coil, 112 the anchor 101 is further pulled into the pressure pipe 118, against the spring force of the pressure spring 124, so that the transitional part 113 and thus the main sealing element 110 are lifted off the main seat 107 via the press pins 111 engaging the bore 114 and thus the main opening 109 is released. This way, the full cross-section available between the high-pressure side H and the low-pressure side N is opened and the maximum amount of gas can flow.

When the anchor 101 is pulled maximally into the pressure pipe 118, it is located in the so-called core position, this means that a rear edge of the anchor 101 contacts the back of the pressure pipe 118, which is embodied in the present case as the core 102.

When the electricity applied to the coil 112 is reduced, due to the spring force first the pilot sealing element 106 closes the pilot seat 103 and subsequently the main sealing element 110 closes the main seat 107, so that at the high-pressure side H the input pressure is completely reestablished and the low-pressure side N can perhaps be released from pressure.

At the valves known from prior art it is considered disadvantageous that at a point of time at which the strongest pressure and spring forces must be overcome, namely at the time at which the pilot sealing element 106 is lifted off the pilot seat 103, between the anchor 101 and the core 102 arranged at the rear the largest operating air gap is given, this means the greatest distance between the anchor 101 and the core 102 arranged at the rear. Due to the fact that a maximally available force of the electromagnet exponentially reduced with increasing operating air gap, the coil system must be sized for this maximally necessary force at this maximal operating air gap so that here coils are necessary with high ampere turns. This is considered disadvantageous.

It is further considered disadvantageous that length tolerances occurring with regards to a depth of the bore in the pressure pipe 118, length tolerances of the anchor 101, of the bore 114 in the anchor 101, as well as length tolerances of the transitional part 113 and in the area of the main sealing element 105 and further in the positioning of the main seat 107 act additively by the serial arrangement of these components, and thus relatively large safety buffers must be considered.

This shall be attained with the present invention.

The objective of the present invention is to provide an electromagnetically operable high-pressure gas valve, which does not show the disadvantages known from prior art.

This objective is attained in an electromagnetically operable high-pressure gas valve as described herein.

BRIEF SUMMARY OF THE INVENTION

In a preferred embodiment, an electromagnetically operable high-pressure gas valve, which is embodied as a pilot valve with a pilot seat and a pilot opening and a main seat with a main opening, with the pilot opening connecting a high-pressure side with a low-pressure side of the valve and it being possible to close it via a main sealing element, the main opening connecting the high-pressure side to the low-pressure side of the valve, and it being possible to close it via a main sealing element, and the valve comprising a pilot anchor, which acts upon the pilot sealing element, and a main anchor, which acts upon the main sealing element, wherein the valve comprises a coil that can be electrified, which is suitably embodied and arranged to act upon the pilot anchor and the main anchor such that a pilot stroke, in which exclusively a pilot anchor is moved, and a main stroke, in which at least the main anchor is moved, are independent from each other.

In another preferred embodiment, the high-pressure gas valve as described herein, wherein the pilot anchor comprises a first operating air gap with a first gap height and the main anchor shows a second operating air gap with a second gap height and the first and the second operating air gap potentially shows different gap heights.

In another preferred embodiment, the high-pressure gas valve as described herein, wherein the first gap height is lower than the second gap height.

In another preferred embodiment, the high-pressure gas valve as described herein, wherein the first gap height is greater than the second gap height.

In another preferred embodiment, the high-pressure gas valve as described herein, wherein the pilot anchor is arranged at least partially inside and concentric in reference to the main anchor.

In another preferred embodiment, the high-pressure gas valve as described herein, wherein the pilot anchor and/or the main anchor are preferably spring-loaded in the closing direction.

In another preferred embodiment, the high-pressure gas valve as described herein, wherein the pilot anchor is guided in the main anchor.

In another preferred embodiment, the high-pressure gas valve as described herein, wherein the first operating air gap and the second operating air gap are arranged magnetically parallel.

In another preferred embodiment, the high-pressure gas valve as described herein, wherein the main anchor or the main anchor and the pilot anchor are arranged and supported in a pressure pipe.

In another preferred embodiment, the high-pressure gas valve as described herein, wherein the pressure pipe is made from a magnetically non-conductive material.

In another preferred embodiment, the high-pressure gas valve as described herein, wherein the pressure pipe is made from a magnetically conductive material and shows at least one device for conducting magnetic flow, particularly a cone.

In another preferred embodiment, the high-pressure gas valve as described herein, wherein the pilot opening is embodied as a bore and preferably shows a diameter of a few tenth of a millimeter, preferably ranges from 0.2 mm to 1.2 mm.

In another preferred embodiment, the high-pressure gas valve as described herein, wherein the first operating air gap shows a magnetically effective area, which is equivalent from 20% to 200% of the magnetically effective area of the second operating air gap, with the areas preferably being approximately of similar sizes.

In another preferred embodiment, the high-pressure gas valve as described herein, wherein the first height ranges from 0.1 mm to 1.0 mm and the second height from 0.3 mm to 2.0 mm.

In another preferred embodiment, the high-pressure gas valve as described herein, wherein the pressure springs, the coil, and the anchors are adjusted such that in case of a pressure drop at the low-pressure side the main anchor closes and the pilot anchor remains open.

DETAILED DESCRIPTION OF THE INVENTION

Figure 1A:
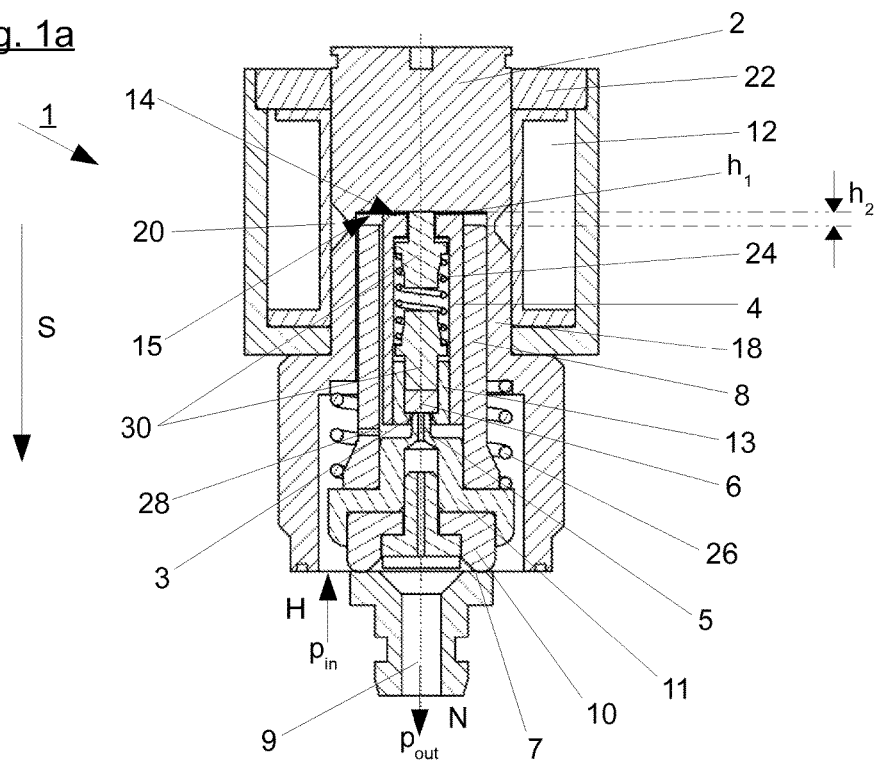
FIG. 1a is a line drawing evidencing a longitudinal cross-section through a first exemplary embodiment of an electromagnetically operable high-pressure gas valve in the closed state.

The electromagnetically operable high-pressure gas valve ac-cording to the invention, which is embodied as a pilot valve with a pilot seat and a pilot opening and a main seat with a main opening, with the pilot opening connecting a high-pressure side with a low-pressure side of the valve and it being possible to close it via a main sealing element, the main opening connecting the high-pressure side to the low-pressure side of the valve, and it being possible to close it via the main sealing element, and the valve comprising a pilot anchor, which acts upon the pilot sealing element, and a main anchor, which acts upon the main sealing element, is characterized in that the valve comprises a coil that can be electrified, which is suitably embodied and arranged to act upon the pilot anchor and the main anchor such that a pilot stroke, in which exclusively a pilot anchor is moved, and a main stroke, in which at least the main anchor is moved, are independent from each other.

Due to the fact that the valve according to the invention separates the pilot function for opening the pilot opening from the opening of the main valve and provides two separate anchors therefore, with the same coil operating thereupon, it is possible to separate the pilot stroke and the main stroke from each other and to separately address them, de-pendent on the environmental conditions given.

Here it is advantageous for the pilot anchor to comprise a first operating air gap with a first gap height and the main anchor to show a second operating air gap with a second gap height, with the first and the second operating air gap per-haps showing different gap heights. This way it is particularly possible that the first gap height is smaller than the second gap height, which leads to the fact that by a reduction of the gap height for the pilot stroke increased force is available, due to the reduced gap height, exponentially increasing with the reduction of the gap height.

Alternatively, the first gap height may be greater than the second gap height, which on the one hand still allows a reduction of the gap height for the pilot stroke, however on the other side allows that the pilot opening remains unsealed even after the execution of the main stroke, because the pilot sealing element is not closed by an appropriate sizing of the gap heights.

In the two above-mentioned variants it is additionally advantageous that the pilot anchor, after the pilot stroke has been executed, is in the core position, this means that the anchor contacts a core arranged inside the coil and this way a reduction of the electricity applied is possible to generate a holding force. Additionally, coils sized identical compared to those of prior art and thus requiring the same structural space and energy can yield higher forces for opening the valves. Alternatively, in case of equal forces, here a smaller structural space and/or reduced energy consumption of the coil can be realized.

A space saving arrangement is yielded when the pilot anchor is at least partially arranged inside and concentric in reference to the main anchor. In a beneficial embodiment, here the main anchor is essentially arranged in a tubular fashion and the pilot anchor is accepted and guided therein. This way, a space saving arrangement is achieved, which can also be easily addressed magnetically, so that the pilot stroke and the main stroke can be decoupled from each other.

In a further development of the invention the pilot anchor and/or the main anchor are preferably spring-loaded in the closing direction. For this purpose, for example pressure springs may be provided, which act in the closing direction upon the respective anchor or a part being in an effective connection thereto. By the above-described higher forces for opening the valve it is also possible to use stronger springs for closing the valves than in prior art, so that higher area compressions towards the sealing elements are yielded. This allows the use of sealing elements made from a harder sealing material, which allows the use of materials with lower hardening at low temperatures and/or higher resistance to wear and tear. Alternatively, under consistent force conditions a smaller structural space and/or lower energy consumption can be realized with the coil.

For a magnetic addressing of the high-pressure gas valve it is beneficial if the first operating air gap and the second operating air gap are arranged magnetically parallel. This way it is possible that by a targeted sizing of the air gaps a swell as the elements arranged in the area of the operating air gaps for guiding the flow a targeted and decoupled addressing of the individual strokes is possible depending on the environmental conditions given.

Advantageously, the main anchor and the pilot anchor are arranged and supported in a pressure pipe. This way, an excellent sealing is achieved in reference to the environment, and any gas leak is prevented with high reliability.

In a further development the pressure pipe comprises at least one device for controlling the magnetic field. This may be embodied for example as a cone for controlling the magnetic field, as a break, or as another installation, which is embodied suitable for controlling the magnetic field. When a cone is provided, it may be generated in a one-piece embodiment of the pressure pipe and the core by a circumferential groove or in a two-part embodiment of the pressure pipe and the core by providing appropriate phases as well as soldering the pressure pipe to the core.

Alternatively the pressure pipe may also be embodied from a non-magnetizable material, with then any control of the magnetic field preferably occurring via exterior braces, for example, rings or disks made from a magnetizable material, through which the magnetic flow is guided into the core that can be magnetized and/or from the anchor back into the coating of the coil that can be magnetized.

A simple embodiment of the pilot opening can be achieved when it is embodied as a bore and preferably shows a diameter of a few tenths of a millimeter for example ranges from 0.2 to 1.2 mm. By embodying the pilot opening as a bore showing the above-stated diameter an enlargement of the diameter can be achieved in reference to prior art, yielding a considerably more robust embodiment, because particularly the pilot opening cannot be soiled or plugged as easily by small particles.

Preferably, the first operating air gap shows a magnetically effective area, which is perhaps equivalent to the magnetically effective area of the second operating air gap. Alternatively, the magnetically effective area of the first operating air gap may range from 20% to 200% of the magnetically effective area of the second operating air gap.

During operation of the above-stated high-pressure gas valve, depending on the given pressure difference between the high-pressure side and the low-pressure side, first the pilot stroke (at high pressure difference) or directly the main stroke (at low pressure difference or balanced pressure conditions) is executed, because the applied magnetic forces are sufficient, dependent on the pressure forces acting due to the pressure difference as well as depending on the sizing of the pressure springs and the operating air gaps pro-vided for pulling the pilot anchor or simultaneously the main anchor and the pilot anchor.

Advantageously, the height and areas of the operating air gaps as well as the sizing of the pressure springs are adjusted to the maximum pressure difference and the coil suit-ably sized such that upon a maximum pressure difference given first the pilot anchor is tightened and, after the pressure equalization between the high-pressure side and the low-pressure side, the main anchor is tightened. In any case, for the sizing is must be observed that a function re-mains upheld even when almost no pressure difference is given.

In one embodiment, in which the first gap height is greater than the second gap height, the pressure springs, the coil, and the anchor are adjusted to each other such that in a pressure drop that can be predetermined at the low-pressure side the main anchor closes, and the pilot anchor and thus the pilot opening remain open.

Depending on the target nominal width of the main opening the valve may be increased or reduced. The respective gap heights then need to be adjusted respectively.

DETAILED DESCRIPTION OF THE FIGURES

FIG. 1a shows a longitudinal cross-section through a first exemplary embodiment of an electromagnetically operable high-pressure gas valve 1. The valve 1 is arranged between a high-pressure side H and a low-pressure side N, with on the high-pressure side H an input pressure $p_{in}$ being applied and on the low-pressure side N an output pressure $p_{out}$. The valve shown may be used for example as a so-called tank discharge valve for gas tanks.

The valve 1 is designed as a so-called pilot valve, with between the high-pressure side H and the low-pressure side N a pilot bore 5 being arranged with a pilot seat 3, which can be closed by a pilot seal element 6. The pilot sealing element 6 can be operated by a pilot anchor 4, with the magnetic field of a coil 12 acting upon it, which can be electrified. The pilot sealing element 6 is supported in a sheath 13 and is impressed into the pilot anchor 4. This way, a reliable and cost-effective fastening and guidance of the pilot sealing element 6 is achieved in the pilot anchor 4.

A flow control of a magnetic field of the coil 12 occurs in the present exemplary embodiment via a core 2, arranged at the rear, with a brace 22 being arranged radially outwardly, offset in reference to the core 2. In the present exemplary embodiment, the brace 22 is embodied in an annular fashion and ensures the control of the magnetic field of the coil 12 in the direction of the core 2. The core 2 is embodied in the frontal direction in one piece with a pressure pipe 18 that can be magnetized, with a biconical shape 20 being formed by a circumferential groove between the core 2 and the pressure pipe 18. The pressure pipe 18 is embodied stepped in the axial direction, with other forms also being possible, here. As an alternative to a cone or a biconical shape 20, the pressure pipe may also be provided with other suitable means to guide magnetic fields. It is decisive that in an electrified coil a saturation or an otherwise magnetic separation is achieved.

A main anchor 8 is supported in the pressure pipe 18, which encompasses the pilot anchor 4 at the outside and simultaneously supports it. At the front, a transitional part 11 is arranged at the main anchor 8, through which the pilot opening 5 is guided, which in the present case is embodied as a bore. Accordingly, the pilot seat 3 is arranged at the rear at the transitional part 11, with the pilot sealing element 6 acting upon it. In the main anchor 8 a radial bore 28 is provided as a supply line to the pilot opening 5, through which gas can flow from the high-pressure side directly to the pilot seat 3, when opened by the pilot opening 5.

Overall, it can be stated here that the pilot anchor 4 is arranged concentrically in reference to the main anchor 8 and is supported therein.

At the front side, a main sealing element 10 is arranged at the transitional part 11, which acts upon a main seat 7 and thus closes a main opening 9 in the direction to the low-pressure side N.

The pilot anchor 4 is pre-stressed in the closing direction S by a pressure spring 24, which in the present exemplary embodiment is held by bearing pins 30 arranged at the front and the rear, and is supported at the rear at the core 2. Similarly, the main anchor 8 is supported via the pressure spring 26 on the circumferential step of the pressure pipe 18, which is impressed in the main anchor 8 on the transitional part 11, and pre-stressed in the closing direction S. Independent from the given pressure conditions and/or pressure differences between the high-pressure side H and the low-pressure side N, a reliable closing and sealing of the high-pressure gas valve 1 is achieved by the pressure springs 24, 26.

In the exemplary embodiment shown in FIG. 1a, here the pilot anchor 4 and the main anchor 8 show two separate operating air gaps 14, 15, with the first operating air gap 14 being allocated to the pilot anchor 4 and the second operating air gap 15 to the main anchor 8. In the present exemplary embodiment the first operating air gap 14 shows a first height h1, which is selected considerably lower than the second height h2 of the second operating air gap 15. This way, by the reduced height h1 of the first operating air gap 14 the electromagnet develops considerably stronger forces for opening the pilot seat 3 in reference to prior art, which has positive effects upon the design of the present high-pressure gas valve 1.

It must be noted as a clear advantage of the present exemplary embodiment that with equal sizing of the coil 12 considerably stronger forces can be obtained in the operating points of the valve by the reduction of the heights h1, h2 of the operating air gaps 14, 15. In spite of the distribution of the magnetically effective area to the pilot anchor 4 and the main anchor 8, by the reduction of the heights h1, h2 of the operating air gaps 14, 15 an increase of forces can be achieved in the respective operating points. This is caused in the fact that the maximally available force increases exponentially with a reduction in height of the operating air gap, but a reduction of the area shows only a linear effect.

This way, overall higher closing forces can be overcome, which on the one hand allows higher pressure differences between the high-pressure side H and the low-pressure side N, or on the other side a more robust design of the high-pressure gas valves 1 is possible with stronger sized pressure springs 24, 26. This way, even at lower pressure differences, for example in case of an almost empty gas tank, due to the pressure springs 24, 26 strong closing forces and thus high security and low leakage rates can be yielded.

In the closed state, on the one hand, the pressure forces act by the pressure difference existing between the high-pressure side H and the low-pressure side N as well as by the forces introduced by the pressure springs 24, 26 in the closing direction and hold closed the high-pressure gas valve 1.

In the closed state of the high-pressure gas valve 1, the first operating gap height h1 amounts to 0.2 mm for example and the second operating gap height h2 to 1.2, for example.

Figure 1B:
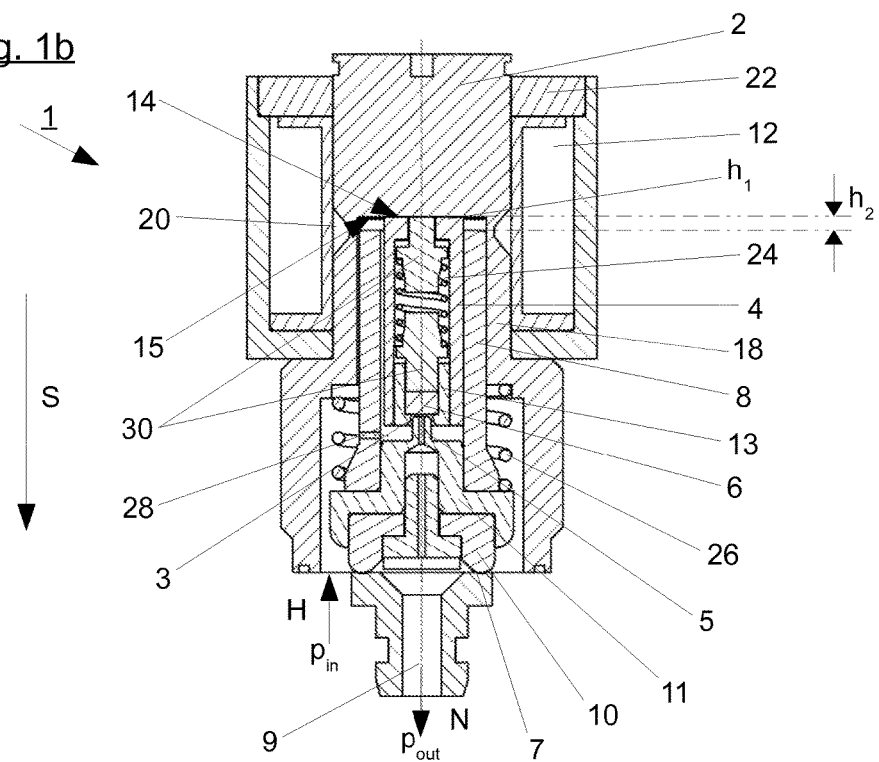
FIG. 1b is a line drawing evidencing the valve of FIG. 1a with an open pilot seat.
Figure 1C:
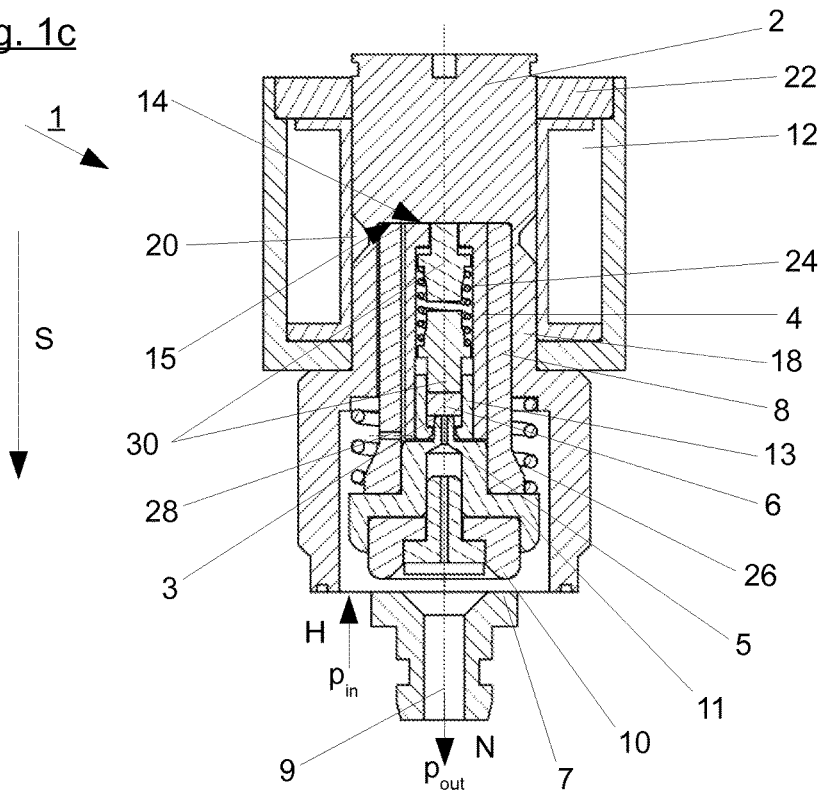
FIG. 1c is a line drawing evidencing the valve of FIGS. 1a and 1b with an open main seat.

Based on the following FIGS. 1b and 1c, now the functionality of the high-pressure gas valve is explained, shown in the closed position in FIG. 1a.

FIG. 1b shows the high-pressure gas valve 1 of FIG. 1a with an opened pilot seat 3.

By electrifying the coil 12 a magnetic field is induced, which first extends over the brace 22 and the core 2 to the cone 20 and as soon as it is saturated it expands over the first operating air gap 14 of the pilot anchor 4 and it enters via the main anchor 8 and then via the pressure pipe 18 back into the coil 12. By the magnetic field applied a force impacting the pilot anchor 4 develops in the direction of the core 2, so that in case of a sufficiently strong magnetic field, against the force impact of the first pressure spring 24 as well as against the pressure acting upon the pilot anchor 4, due to the pressure difference between the input pressure $p_{in}$ and the output pressure $p_{out}$ it is pulled in the direction of the core 2 until it contacts it. The movement of the pilot anchor 4 is transferred via the sheath 13 to the pilot sealing element 6, which is thereby lifted off the pilot seat 3 so that the pilot opening 5 is released. Now, a pressure equalization occurs by the radial bore 28 as well as the pilot bore 5 between the input pressure $p_{in}$ existing at the high-pressure side H and the output pressure $p_{out}$ existing at the low-pressure side N. Due to this pressure compensation, almost identical pressures are applied at the input and the output side so that now almost exclusively the spring force of the second pressure spring 26 acts upon the main anchor 8.

Due to the now reduced forces acting in the closing directions, the magnetic field of the coil 12 is strong enough to pull the main anchor 8 in the direction of the core 2, opposite the spring force of the second pressure spring 26. This way, the main sealing element 10 is lifted off the main seat 7 and thus the main opening 9 is released, which in the present case is also embodied as a bore.

This situation is shown in FIG. 1c.

As discernible from the illustration in FIG. 1c, now gas can flow from the high pressure side H directly through the main opening 9 to the low pressure side N. Due to the different-ly sized embodiment of the two operating air gaps 14, 15, the pilot seat 3 contacts the pilot sealing element 6 in a motion of the main anchor 8 in the direction of the core 2 and pushes it against the force of the first pressure spring 24 further in the direction of the core 2. The pilot opening 5 is thus closed again.

When the electrification of the coil 12 ends, the two anchors 4, 8 are moved by the forces introduced by the pressure springs 24, 26 in the closing direction S and thus the valve 1 is closed again. The high-pressure side H and the low-pressure side N are then once more separated from each other.

In the exemplary embodiment described with reference to FIGS. 1a to 1c it shall be emphasized as a particular ad-vantage that the first operating air gap 14 of the pilot anchor 4 can be designed with a very low first gap height h1, providing particularly strong forces for opening the pilot seat 3.

Figure 2A:
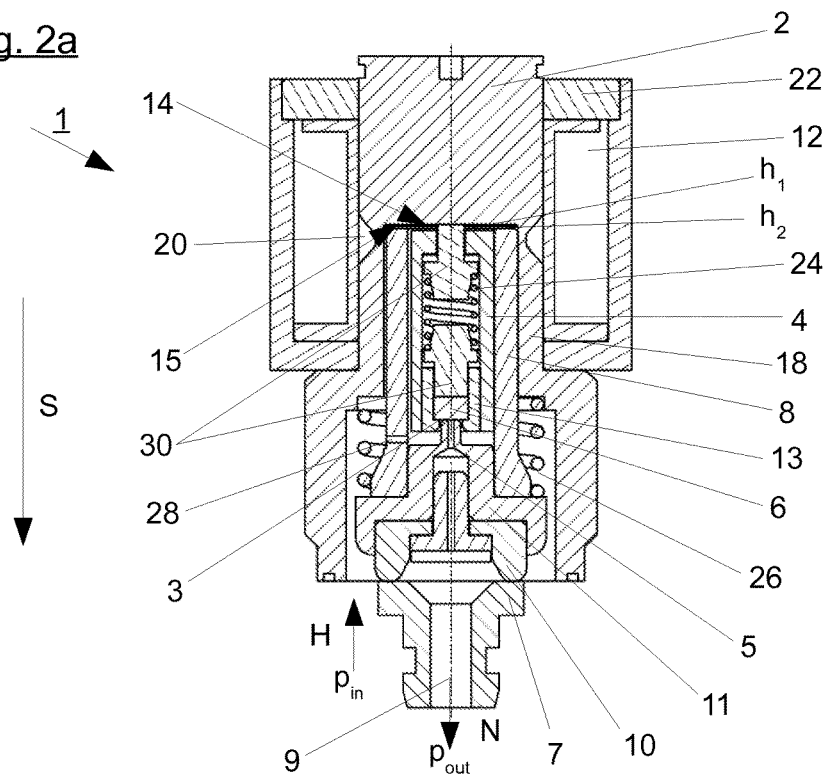
FIG. 2a is a line drawing evidencing a longitudinal cross-section through a second exemplary embodiment of a magnetically operable high-pressure gas valve in the closed state.
Figure 2B:
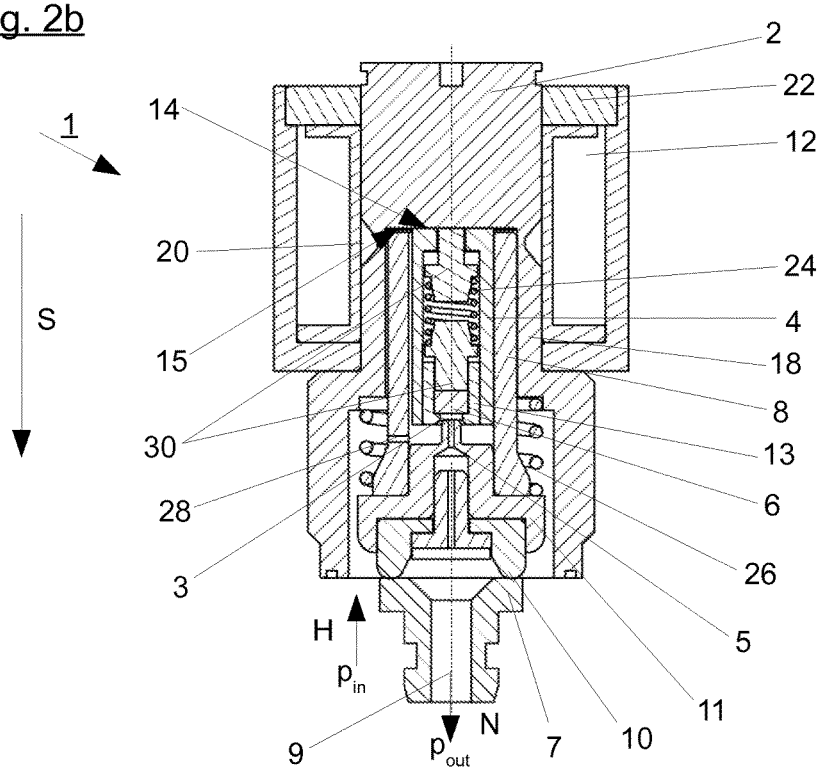
FIG. 2b is a line drawing evidencing the valve of FIG. 2a with an open pilot seat.
Figure 2C:
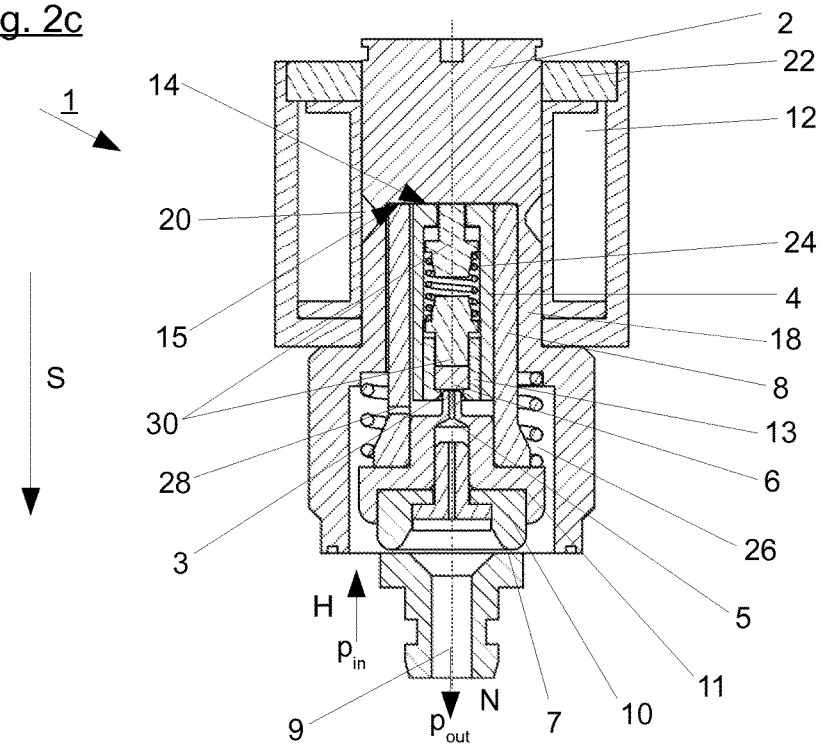
FIG. 2c is a line drawing evidencing the valve of FIGS. 2a and 2b with an open main seat.
Figure 3:
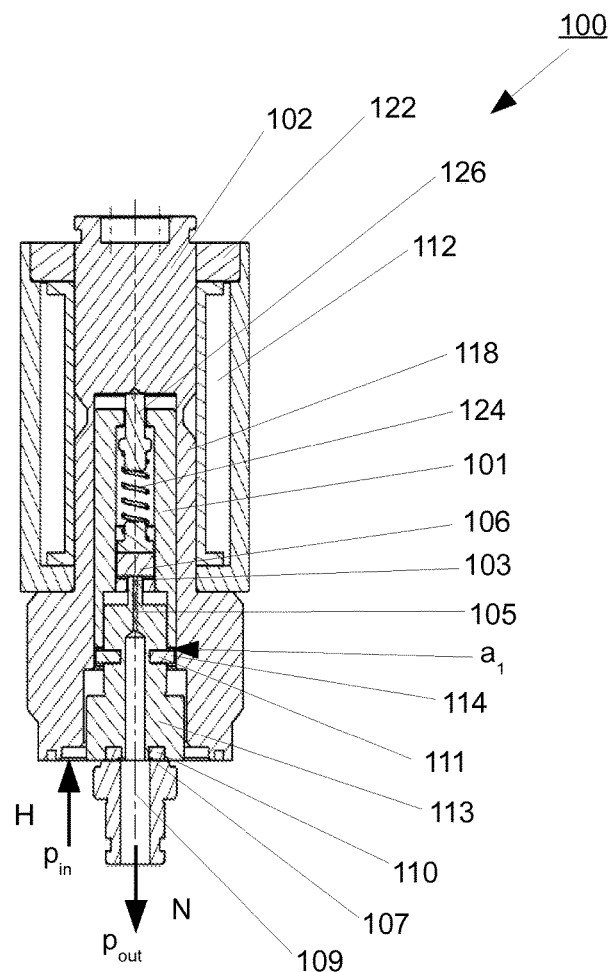
FIG. 3 is a line drawing evidencing a longitudinal cross-section through an electromagnetically operable high-pressure gas valve according to prior art (already discussed).

FIGS. 2a to 2c show a second exemplary embodiment of an electromagnetically operable high-pressure gas valve 1, which differs from the exemplary embodiment described in FIGS. 1a to 1c by a different sizing of the operating air gaps 14, 15.

FIG. 2a shows a longitudinal cross-section through the second exemplary embodiment of the high-pressure gas valves 1, with the valve 1 being shown in the closed position.

In the present exemplary embodiment the first operating air gap 14 and the second operating air gap 15 are sized such that the first gap height h1 of the first operating air gap 14 is selected greater than the second height h2 of the second operating air gap 15.

In order to avoid unnecessary repetitions, with regards to the other elements reference is made to the description in FIGS. 1a to 1c.

FIG. 2b shows the valve 1 with an open valve seat 3. As already described, the pilot anchor 4 is pulled by a magnetic field induced in the coil 12 in the direction of the core 2, until it contacts the core 2. As already described, in this pilot position a pressure equalization is achieved between the high pressure side H and the low pressure side N, so that the pressures acting upon the main anchor 8 are essentially compensated due to the pressure difference between the high pressure side H and the low pressure side N.

In FIG. 2c, the valve 1 is in the open position, this means shown with the main anchor 8 tightened and with the main sealing element 10 lifted off the main seat 7. In this position, a direct fluid flow occurs from the high-pressure side H to the low-pressure side N, with here however the pilot sealing element 6 still remaining lifted off the pilot seat 3, because the first gap height h1 of the first operating gap 14 is selected greater than the second height h2 of the second operating air gap 15. The pilot opening 5 is here still largely released.

It can be considered an advantage of this embodiment that in case of a broken pipe at the low-pressure side, i.e. when a pressure drop occurs at the low-pressure side, the valve can be sized such that due to the occurring pressures the main anchor 8 is moved downwards and thus the main seat 7 is closed, while the pilot anchor 4 remaining in the core position and thus the pilot opening 5 remains open. The reason for this is the fact that the main anchor 8 in this situation is impinged on the one side with high pressure and on the other side with a considerably lower pressure and thus pressures and spring forces act in the closing direction. The pilot anchor 4 however is impinged at both sides with high pressure so that it remains open. By a suitable design of the above-mentioned elements, the pressure difference can be predetermined, at which this closing of the main anchor 8 occurs.

LIST OF REFERENCE NUMBERS

1 High-pressure gas valve
2 Core
3 Pilot seat
4 Pilot anchor
5 Pilot opening
6 Pilot sealing element
7 Main seat
8 Main anchor
9 Main opening
10 Main sealing element
12 Coil
14 first operating air gap
15 second operating air gap
18 Pressure pipe
20 Cone/biconical shape
22 Brace
24 first pressure spring
26 second pressure spring
100 High-pressure gas valve
101 Anchor
102 Core
103 Pilot seat
105 Pilot opening
106 Pilot sealing element
107 Main seat
109 Main opening
110 Main sealing element
111 Pressure pins
112 Coil
113 Transitional part
114 Bore
118 Pressure pipe
122 Brace
124 Pressure spring
126 Pin
H High-pressure side
N Low-pressure side
$h_1$ first gap height
$h_2$ second gap height
S Closing direction
d Diameter
$a_1$ first distance
$p_{in}$ Input pressure
$p_{out}$ Output pressure The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An electromagnetically operable high-pressure gas valve, which is embodied as a pilot valve with a pilot seat and a pilot opening and a main seat with a main opening, with the pilot opening connecting a high-pressure side with a low-pressure side of the high-pressure gas valve and it being possible to close it via a main sealing element, the main opening connecting the high-pressure side to the low-pressure side of the high-pressure gas valve, and it being possible to close the main opening via the main sealing element, and the high-pressure gas valve further comprising a pilot anchor, wherein the pilot anchor acts upon a pilot sealing element, and a main anchor, wherein the main anchor acts upon the main sealing element, wherein the high-pressure gas valve further comprises a coil that can be electrified, wherein the coil is suitably embodied and arranged to act upon the pilot anchor and the main anchor such that a pilot stroke, in which exclusively a pilot anchor is moved, and a main stroke, in which at least the main anchor is moved, are independent from each other, wherein the main anchor is spring-loaded via a pressure spring in the closing direction, and wherein, the pilot anchor is arranged partially inside and concentrically in reference to the main anchor.

2. The high-pressure gas valve of claim 1, wherein the pilot anchor comprises a first operating air gap with a first gap height and the main anchor shows a second operating air gap with a second gap height and the first and the second operating air gap potentially shows different gap heights.

3. The high-pressure gas valve of claim 2, wherein the first gap height is lesser than the second gap height in the closed state of the high-pressure gas valve.

4. The high-pressure gas valve of claim 3, wherein the first gap height ranges from 0.1 mm to 1.0 mm and the second gap height from 0.3 mm to 2.0 mm.

5. The high-pressure gas valve of claim 2, wherein the first gap height is greater than the second gap height in the closed state of the high-pressure gas valve.

6. The high-pressure gas valve of claim 5, wherein pressure springs, the coil, and the anchors are adjusted to each other such that in case of a pressure drop at the low-pressure side the main anchor closes and the pilot anchor remains open.

7. The high-pressure gas valve of claim 2, wherein the first operating air gap and the second operating air gap are arranged magnetically parallel to each other.

8. The high-pressure gas valve of claim 2, wherein the first operating air gap shows a magnetically effective area, which is similar to the magnetically effective area of the second operating air gap.

9. The high-pressure gas valve of claim 1, wherein the pilot anchor is spring-loaded in the closing direction.

10. The high-pressure gas valve of claim 1, wherein the pilot anchor is guided in the main anchor.

11. The high-pressure gas valve of claim 1, wherein the main anchor or the main anchor and the pilot anchor are arranged and supported in a pressure pipe.

12. The high-pressure gas valve of claim 11, wherein the pressure pipe is made from a magnetically non-conductive material.

13. The high-pressure gas valve of claim 11, wherein the pressure pipe is made from a magnetically conductive material and shows at least one device for conducting magnetic flow.

14. The high-pressure gas valve of claim 1, wherein the pilot opening is embodied as a bore and preferably shows a diameter from 0.2 mm to 1.2 mm.

* * * * *